(12) United States Patent
Villada Castillo et al.

(10) Patent No.: US 9,416,275 B2
(45) Date of Patent: Aug. 16, 2016

(54) BIODEGRADABLE FILMS OBTAINED FROM CASSAVA STARCH AND THEIR MANUFACTURE PROCESS

(71) Applicants: UNIVERSIDAD DEL CAUCA, Popayan (CO); CENTRO REGIONAL DE PRODUCTIVIDAD E INNOVACION DEL CAUCA CREPIC, Popayan (CO)

(72) Inventors: Hector Samuel Villada Castillo, Popayan (CO); Diana Paola Navia Porras, Cali (CO); Juan Pablo Castaneda Nino, Pereira (CO)

(73) Assignee: Universidad Del Cauca, Popayan (CO)

( * ) Notice: Subject to any disclaimer, the term of this patent is extended or adjusted under 35 U.S.C. 154(b) by 62 days.

(21) Appl. No.: 14/346,460

(22) PCT Filed: Sep. 21, 2012

(86) PCT No.: PCT/IB2012/055034
§ 371 (c)(1),
(2) Date: Mar. 21, 2014

(87) PCT Pub. No.: WO2013/042083
PCT Pub. Date: Mar. 28, 2013

(65) Prior Publication Data
US 2014/0235763 A1    Aug. 21, 2014

(30) Foreign Application Priority Data

Sep. 23, 2011 (CO) ................. 2011124719

(51) Int. Cl.
| | | |
|---|---|---|
| *C08L 3/02* | (2006.01) | |
| *B29C 47/78* | (2006.01) | |
| *C08L 99/00* | (2006.01) | |
| *C08L 97/02* | (2006.01) | |
| *B29D 7/01* | (2006.01) | |
| *C08J 5/18* | (2006.01) | |
| *C08J 3/18* | (2006.01) | |
| *C08J 3/24* | (2006.01) | |
| *B29C 47/00* | (2006.01) | |
| *B29C 47/80* | (2006.01) | |
| *C08J 3/20* | (2006.01) | |
| *B29C 47/82* | (2006.01) | |
| *B29C 47/86* | (2006.01) | |
| *B29K 67/00* | (2006.01) | |

(52) U.S. Cl.
CPC ............. *C08L 99/00* (2013.01); *B29C 47/0004* (2013.01); *B29C 47/78* (2013.01); *B29C 47/807* (2013.01); *B29C 47/827* (2013.01); *B29C 47/862* (2013.01); *B29D 7/01* (2013.01); *C08J 3/18* (2013.01); *C08J 3/20* (2013.01); *C08J 3/246* (2013.01); *C08J 5/18* (2013.01); *C08L 3/02* (2013.01); *C08L 97/02* (2013.01); *B29C 47/0021* (2013.01); *B29K 2003/00* (2013.01); *B29K 2067/046* (2013.01); *B29K 2995/006* (2013.01); *B29K 2995/0056* (2013.01); *C08J 2303/02* (2013.01); *C08J 2367/04* (2013.01); *C08J 2397/02* (2013.01); *C08J 2399/00* (2013.01); *C08J 2467/04* (2013.01); *C08J 2497/02* (2013.01)

(58) Field of Classification Search
None
See application file for complete search history.

(56) References Cited

U.S. PATENT DOCUMENTS

| | | | | |
|---|---|---|---|---|
| 5,234,977 A | * | 8/1993 | Bastioli | C08J 5/18 524/404 |
| 5,412,005 A | * | 5/1995 | Bastioli | A61L 15/225 524/366 |
| 5,462,983 A | * | 10/1995 | Bloembergen | C08L 3/06 523/128 |
| 5,540,929 A | * | 7/1996 | Narayan | C08B 31/04 424/422 |
| 5,801,224 A | * | 9/1998 | Narayan | C08G 63/08 524/47 |
| 5,821,286 A | * | 10/1998 | Xu | C08J 5/18 106/206.1 |
| 5,861,461 A | * | 1/1999 | Lee et al. | 525/54.26 |
| 5,922,379 A | | 7/1999 | Wang | |
| 6,231,970 B1 | * | 5/2001 | Andersen | C08L 3/02 106/145.1 |
| 7,067,651 B2 | | 6/2006 | Poovarodom et al. | |
| 7,608,649 B2 | * | 10/2009 | Sun | C08L 3/02 524/47 |
| 2002/0094444 A1 | * | 7/2002 | Nakata | A41D 19/0055 428/480 |
| 2006/0111511 A1 | * | 5/2006 | Narayan | C08B 31/00 525/54.2 |
| 2006/0252901 A1 | * | 11/2006 | Narayan | C08B 31/00 527/300 |
| 2009/0160095 A1 | * | 6/2009 | Narayan | C08F 251/00 264/331.21 |
| 2009/0171037 A1 | * | 7/2009 | Aoshima | C08G 63/16 525/418 |
| 2010/0266858 A1 | * | 10/2010 | Chopinez | B32B 27/06 428/457 |
| 2012/0220680 A1 | * | 8/2012 | Bastioli | C08G 63/183 521/182 |

(Continued)

FOREIGN PATENT DOCUMENTS

| | | |
|---|---|---|
| CN | 1749317 | 3/2006 |
| EP | 1580237 | 9/2005 |
| KR | 20060115648 | 9/2006 |

(Continued)

OTHER PUBLICATIONS

Martin, et al. "In-Line Determination of Plasticized Wheat Starch Viscoelastic Behavior: Impact of Processing." Carbohydrate Polymers 53 (2003) 169-182.

(Continued)

*Primary Examiner* — Jeffrey Wollschlager
(74) *Attorney, Agent, or Firm* — Reed Smith LLP; Mark T. Vogelbacker

(57) ABSTRACT

The present invention is related to the elaboration of flexible films from cassava starch for the manufacture of biodegradable packaging useful in the packing and packaging of dry foods and other products. The novel films of the invention are produced by extrusion of a mixture of cassava starch and plasticizer.

1 Claim, 2 Drawing Sheets

(56) References Cited

U.S. PATENT DOCUMENTS

2012/0283364 A1* 11/2012 Sarazin ............... C08L 3/02
    524/47
2014/0148534 A1* 5/2014 Hou ................. C08L 67/02
    524/47

FOREIGN PATENT DOCUMENTS

RU      2136367      9/1999
RU      2341090      12/2008

OTHER PUBLICATIONS

Averous, et al. "Starch-Based Biodegradable Materials Suitable for Thermoforming Packaging." Starch/Starke 53 (2001) 368-371.

Averous, et al. "Biocomposites Based on Plasticized Starch: Thermal and Mechanical Behaviours." Carbohydrate Polymers 56 (2004) 111-122.

Bastioli, "Global Status of the Production of Biobased Packaging Materials." Starch/Starke 53 (2001) 351-355.

Dole, et al. "Gas Transport Properties of Starch Based Films." Carboydrate Polymers 58 (2004) 335-343.

Fama, et al. "Mechanical Properties of Tapioca-Starch Edible Films Containing Sorbates." LWT 38 (2005) 631-639.

Finkenstadt, et al. "A Direct-Current Resistance Technique for Determining Moisture Content in Native Starches and Starch-Based Plasticized Materials." Carboydrate Polymers 55 (2004) 149-154.

Forssell, et al. "Oxygen Permeability of Amylose ADN Amylopectin Films." Carboydrate Polymers 47 (2002) 125-129.

Guan, et al. "Functional Properties of Extruded Foam Composites of Starch Acetate and Corn Cob Fiber." Industrial Crops and Products 19 (2004) 255-269.

Jasson, et al. "Influence of Thickness on the Mechanical Properties for Starch Films." Carboyhydrate Polymers 56 (2004) 499 503.

Ma, et al. "The Plastcizers Containing Amide Groups for Thermoplastic Starch." Carbohydrate Polymers 57 (2004) 197-203.

Miura, et al. "Thermal and Viscoelastic Properties of Alginate/Poly(Cinyl Alcohol) Blends Cross-Linked With Calcium Tetraborate." Carbohydrate Polymers 39 (1999) 139-144.

Muratore, et al. "The Influence Fo Using Biodegradable Packaging Films on the Quality Decay Kinetic of Plum Tomato (Pomodorinodatterino)." Journal of Food Engineering 67 (2005) 393-399.

Parra, et al. "Mechanical Properties and Water Vapor Transmission in Some Blends of Cassava Starch Edible Films." Carbohydrate Polymers 58 (2004) 475-481.

Pedroso, et al. "Mechanical, Thermal and Morphological Characterization of Recycled LDPE/Corn Starch Blends." Carbohydrate Polymers 59 (2005) 1-9.

Peesan, et al. "Preparation ADN Characterization of Hexanoyl Chitosan/Polylactide Blend Films." Carbohydrate Polymers 60 (2005) 343-350.

Petersson, et al. "Water Vapou Permeability and Mechanical Properties of Mixed Starch-Monoglyceride Films and Effect of Filming Forming Conditions." Food Hydrocolloids 19 (2005) 123-132.

Rahman, et al. "The Plasticizer Market: An Assessment of Traditional Plasticizers and Research Trends to Meet New Challenges." Pog. Polm, Sci. 29 (2004) 1223-1248.

Salgado, et al. "Biodegradable Foams Based on Cassava Starch, Sunflower Proteins and Cellulose Fibers Obtained by a Baking Process." Journal of Food Engineering 25 (2008) 435-443.

Shamekh, et al. "Film Formation Properties of Potato Starch Hydrolysates." Starch/Starke 54 (2002) 20-24.

Shogren, et al. "Development of Starch Based Plastics—A Reexamination of Selected Polymer Systems in Historical Perspective." Starch/Starke 45 (1993) Nr. 8 , S. 276-280.

Smits, et al. "The Influence of Various Small Plasticisers and Malto-Oligosaccharides on the Retrogradation FO (Partle) Gelatinisde Starch." Carbohydrate Polymers 51 (2003) 417-424.

Tapia-Blacido, et al. "Development and Characterization of Biogilms Based on Amaranth Flour (Amaranthus Caudatus)." Journal of Food Engineering 67 (2005) 215-223.

Tharanathan, "Biodegradable Films and Composite Coatings: Past, Present and Future." Trends in Food Science & Technology 14 (2003) 71-78.

Thitipraphunkul, et al. "A Comparative Study of Edible Canna (Canna Edulis) Starch From Different Cultivars. Part I. Chemical Composition and Physicochemical Properties." Carbohydrate Polymers 53 (2003) 317-324.

Tserki, et al. "Novel Biodegradable Composites Bassed on Treated Lignocellulosic Waste Flour As Filler. Part II. Developments of Biodegradable Composites Using Treated and Compatibilized Waste Flour." Composites: Part A 37 (2006) 1231-1238.

Van Soest, et al. "Crystallinity in Starch Bioplastics." Industrial Crops and Products 5 (1996) 11-22.

Van Soest, et al. "The Influence of Starch Molecular Mass on the Properties of Extruded Thermoplastic Starch." Polymer vol. 37, No. 16, pp. 3543-3552.

Villada, et al. "Biopolymers Naturals Used in Biodegradable Packaging." Temas Agrarios, vol. 12:(2), Julio-Diciembre 2007 (5-13).

Wang, et al. "Properties of Poly(Lactic Acid) Blends With Various Starches As Effected by Physical Aging." Journal of Applied Polymer Science, vol. 90, 3683-3689 (2003).

Xu, et al. "Chitosan-Starch Composite Film: Preparation and Characterization." Industrial Crops and Products 21 (2005) 185-192.

* cited by examiner

BIODEGRADABLE FILMS OBTAINED FROM CASSAVA STARCH AND THEIR MANUFACTURE PROCESS

RELATED APPLICATIONS

This application is the United States National Stage of International Application No. PCT/IB2012/055034, filed Sep. 21, 2012, which was published as International Publication No. WO 2013/042083, and which claims benefit of Columbian Patent Application No. 2011124719 filed Sep. 23, 2011. Both applications are incorporated by reference in their entirety herewith.

TECHNICAL FIELD

The present invention is related to novel methods to obtain flexible biodegradable-type films from cassava starch.

BACKGROUND ART

The main function of packages is the preservation and protection of all types of products, with foods and raw materials the field of highest priority. These products require attention given the contamination generated by microorganisms (bacteria, spores, fungi, etc.) during manipulation (Tharanathan, 2003). Protection is made through packages, which are generally elaborated from synthetic polymers. Nevertheless, the indiscriminate use of synthetic packages has generated serious ecological problems, contributing to environmental contamination provoked by solid wastes of low degradability, which has driven the search for natural biopolymers. Availing of natural resources as a source of conservation and recycling becomes an excellent option and innovation in the development of new biodegradable products. Its total biodegradation into products like CO2, water, and then into compost is a great advantage against synthetic products (Bastioli, 2001).

Total replacement of synthetic plastics by biodegradable materials to elaborate packages has not been accomplished until now; nevertheless, in specific applications some synthetic polymers have been substituted by other natural materials. Said replacements have permitted the development of products with specific characteristics related to barrier, mechanical, and thermal properties in certain packages like films, protectors, foams, wrappings, plates, cups, spoons, bags, etc., (Avérous and Boquillon, 2004; Wang et al., 2003).

Natural biopolymers come from four big sources: animal origin (collagen/gelatin), marine origin (chitin/chitosan), agricultural origin (lipids and fats and hydrocolloids: proteins and polysaccharides), and microbial origin (polylactic acid (PLA) and polyhydroxyalkanoates (PHA)) (Tharanathan, 2003).

Polysaccharides are known for their complex structure and functional diversity (Stawaski and Jantas, 2003). The linear structure present in cellulose (1,4-b-D-glucan), amylose (a component of starch 1,4-a-D-glucan), and chitosan (1,4-b-D-carbohydrate polymer) provide the films hardness, flexibility, and transparency; the films are resistant to fats and oils.

Starch is an abundant raw material, specifically that coming from corn. It has thermoplastic properties when structural disruption takes place at molecular level. The presence of amylose at 70% in amylose-corn starches gives a strong structure and more flexibility to the film. The branched structure of amylopectin generally gives the film poor mechanical properties. The compounds of hydroxypropylated starches are used for the preservation of candies, raisins, nuts, and dates to avoid oxidative rancidity (Tharanathan, 2003). Synthesis of copolymerization and grafting of monomers like acrylonitrile (AN) generate a precursor of acrylic fibers used in the preparation of starch compounds plus polymer (starch-graft-PAN), which are also biodegradable (Tharanathan, 2002).

Research on biodegradable plastics based on starch began since 1970 and currently continue in several laboratories throughout the world. Technologies still being developed are related to the incorporation of the starch granule or starch in gelatinized form to the formulations of films manufactured in processes of compression, extrusion blowing, single or double-screw extrusion and injection molding (Blacido et al., 2005; Parra et al., 2004). The problem presented by the films manufactured with starch is sensitivity to humidity, which has been reduced by using in the formulations polyvinylalcohol (PVA), glycerin, sorbitol, nitrogenous bases, etc., (Shamekin et al., 2002; Smits et al., 2003; Finkenstadt and Willett, 2004; Yu, 2004; Acosta et al., 2006). Plasticization of the native starch granule or hydrolyzed starch is obtained through the structural disruption resulting from a decrease of the crystals during the extrusion process and the action of the plasticizer, with a new type of material emerging known as thermoplastic starch (TPS) (Acosta et al., 2005; Villada, 2005). Likewise, studies have been conducted on TPS made from amylose and amylopectin; in these, the barrier properties were analyzed, showing high permeability to $O_2$ and decrease on water vapor in amylose TPS compared to those elaborated from amylopectins (Forssell et al., 2002; Dole et al., 2004; Jansson and Thuvander, 2004; Blacido et al., 2005).

TPS is a material obtained through the structural disruption (modification) occurring within the starch granule when it is processed with low water content and the action of thermal and mechanical forces in the presence of plasticizers that do not evaporate easily during processing (Bastioli, 2001). TPS presents several attributes, besides its biodegradability, it is a flexible and renewable material and it can be easily adapted to different processes of thermoplasticization by using standard equipment used in the manufacture of synthetic polymers, like injection molding, extrusion blow molding, injection molding, molding by compression, extrusion of flat film and radiation by molding (Van Soest et al., 1996b; Zhai et al., 2003).

Adding natural polymers like starch inside the polyethylene (synthetic polymer), in granular form between 6 and 30% is another approach in the manufacture of biodegradable packaging. Films from starch and low-density polyethylene (LDPE) contain up to 30% starch, shown as a partially biodegradable material. Another application of starch is the combination in gelatinized form in proportions between 30 and 70% mixed with synthetic polymers also gelatinized, like the case of polyvinylalcohol in proportions varying between 10 and 20% (Muratore et al., 2005).

Different products exist in the market made of synthetic polymers and gelatinized starch commercialized by Mater-Bi® (Hanna, 2004). However, currently both types of materials cannot be considered completely biodegradable compounds (Pedroso and Rosa, 2005). Plastic bottles of starch formed from foams through mixtures of starch with polylactic acid are used as filler material that dampens and protects against blows and vibrations during transport (Peesan et al., 2005; Xu et al., 2005).

In spite of the advantages of materials derived from starch, TPS presents little stability when humidity conditions are high (Avérous and Frigant, 2001; Avérous and Boquillon, 2004; Avérous et al., 2003). One of the problems of using TPS in bio-plastics is its fragile nature, relatively caused by its low vitreous transition temperature (Tg) and the lack of sub-Tg relaxation due to the starch's molecular chain (Kenshi et al., 1999; Shogren et al., 1993). Additionally, eventual migration of plasticizers into the environment increases the material's fragility (De Graaf et al., 2003). Fragility is a problem of structural stability that increases over time due to diminished free volume and retrogression of starch (Kuakoon et al., 2003). To increase TPS flexibility, a wide variety of plasticizers have been used like sugar, polyalcohols, amino acids, lipids, sorbates, and phosphates (De Graaf et al., 2003; Fama et al., 2005; Kuakoon et al., 2003; Nashed et al., 2003; Parra et al., 2004; Petersson and Standing, 2005). Some studies hold that nitrogenous compounds prevent retrogression in starch gels longer than other additives, increasing the stability of the gel (Ma and Yu, 2004; Shogren et al., 1993). However, most nitrogenous compounds are in solid state and melt at high temperatures yielding little flexibility (Avérous and Frigant, 2001). Another problem in the development of TPS is the presence of high contents of amylose, which diminishes flexibility compared to TPS made from high contents of amylopectin (Van Soest and Essers, 1997). Additionally, during storage the TPS made from native starches undergo structural changes, presenting greater fragility or rigidity depending on plasticizer content (Van Soest et al., 1996a).

To summarize, against ordinary plastic polymers, thermoplastic starch presents disadvantages like: its solubility in water, high hygroscopicity, rapid aging due to retrogression, and poor mechanical properties, which limit some applications like packing. These problems have been reduced by incorporating onto the thermoplastic matrix natural fillers like cellulosic fibers that serve as reinforcement material to improve the mechanical properties: effort and elongation, properties of vital importance in evaluating any synthetic or biodegradable plastic material, given that they permit characterizing the material and its application in the development of any package (Salgado et al., 2008). These compound materials are comprised of three phases: reinforcement that provides resistance and rigidity, the matrix that is the material sought to reinforce, and the interface responsible for adequate compatibility between the matrix and the reinforcement (Tserki et al, 2005), where the quality of the interface determines the final properties of the material, permitting correct fiber-matrix adhesion, ensuring transference of stress from the matrix to the fiber (Tserki et al., 2006).

In the field of patents different publications are found related to biodegradable plastic mixtures that incorporate starch in their composition, for example, U.S. Pat. No. 586, 141 reveals a biodegradable plastic composition comprising a polyethylene matrix and a biodegradable aliphatic polyester, native corn starch, potato, rice, and their mixtures or modified, a starch plasticizer, a starch de-structuring agent, a coupling agent, a radical initiator, and an antioxidant agent. Likewise, the patent claims a procedure for the elaboration of the biodegradable plastic composition comprising the stages of: (i) Feeding a mixture of polyethylene and a biodegradable aliphatic polyester in proportions 1:1 to 1:30, the coupling agent and a radical initiator through the chute of a twin-screw extruder and a mixture of starch, plasticizer, de-structuring agent, and antioxidant through the lateral chute of a twin-screw extruder; (ii) Mixing the matrix and the starch mixture, and (iii) Subjecting the mixture to reactive extrusion at a temperature from 150 to 220° C. at a screw rate of 50 to 300 rpm.

U.S. Pat. No. 6,235,816 points to a method to manufacture a biodegradable thermoplastic mixture comprised of: (i) Combining pre-dried starch and a plasticizer agent to form a molten thermoplastic starch with water content below 1%; (ii) Combining at least one polymer selected from the group comprising: aromatic polyesters, polyester copolymers of aromatic and aliphatic blocks, polyester amides, polyethylene oxide polymers, polyglycols, and polyester urethanes with the molten thermoplastic starch and an aliphatic polyester (PLA, PCL, polyhydroxybutyric acid or copolymer of polyhydroxybutyric and hydroxyvaleric acid), where the thermoplastic starch comprises between 10 and 95 weight % of the starch/polymer mixture and the stage is carried out at one or more temperatures in the range from 120 to 260° C., preferably between 140 and 160° C.; (iii) Solidifying the mixture in water and permitting the mixture to reabsorb water to a content in the range of 1 to 6 weight %.

BRIEF DESCRIPTION OF DRAWINGS

Description of Drawings

Figure 1:
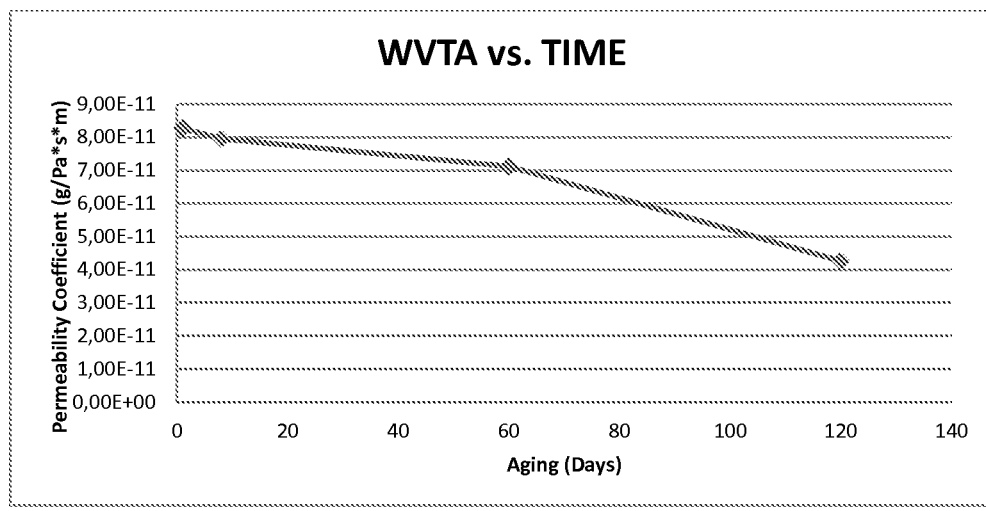

FIG. 1 presents the gas content in the headspace of the packages obtained according to the first aim of the invention: a) native biodegradable film (NBF); b) hydrolyzed biodegradable film (HBF); polypropylene film (PF).

Figure 2:
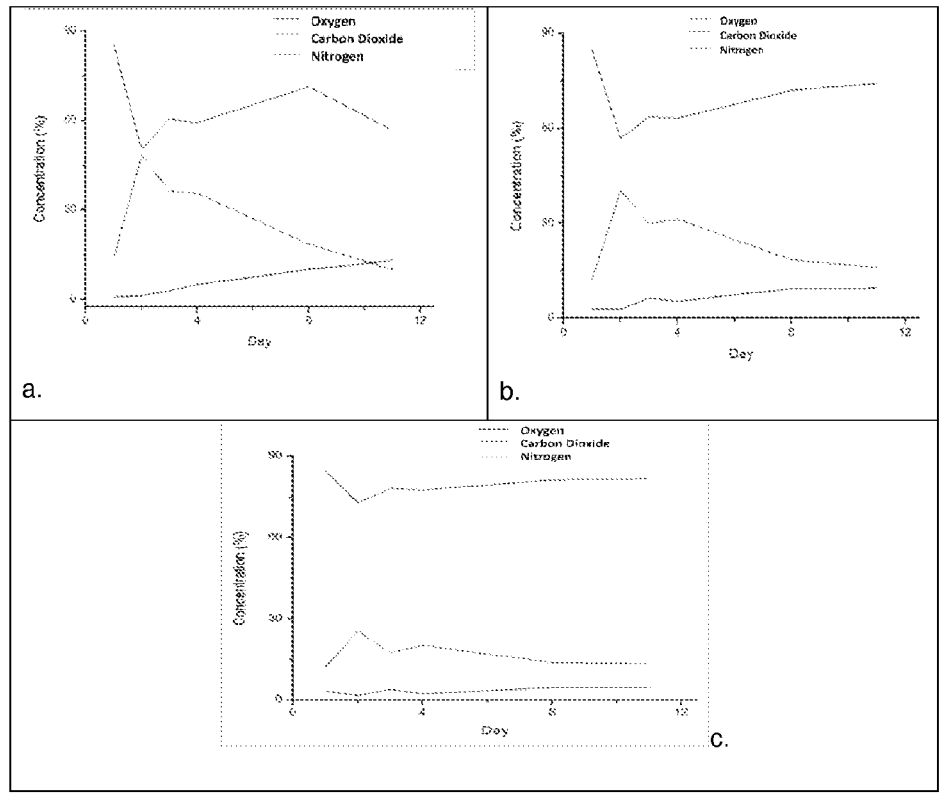

FIG. 2 shows the concentration of oxygen, carbon dioxide, and nitrogen for the 'lady finger' bananas packed during nine days in the three types of packages elaborated employing the flexible films according to the second aim of the invention.

BEST MODE FOR CARRYING OUT THE INVENTION

Best Mode

In a first aspect, the invention is related to a process for the production through extrusion of flexible biodegradable films, elaborated from mixtures of cassava starch, plasticizer, polylactic acid (PLA) and polycaprolactone (PCL).

In a second aspect, the invention reveals flexible biodegradable films, elaborated from mixtures of cassava starch, plasticizer, polylactic acid (PLA) and polycaprolactone (PCL) and the sheets obtained by employing said films.

The present invention claims in a first object a process for the production through extrusion of flexible biodegradable films, elaborated from mixtures of cassava starch, plasticizer, polylactic acid (PLA), and polycaprolactone (PCL), comprising the stages of:

1. Milling and sieving in 50/bottom mesh the native or hydrolyzed cassava starch with α-amylase obtained from *Bacillus amyloliquefaciens* according to the procedure described in example 3.

2. Mixing the starch with glycerol as plasticizer agent and storing for 12-36 h at a temperature between 15 and 25° C.

3. Obtaining the thermoplastic starch (TPS) rod [T1] through extrusion of the mixture at a screw rate of 40 to 60 rpm with a temperature profile of 90-110/95-115/100-120/89-109° C.

4. Drying the TPS at a temperature between 40 and 50° C. during 12 a 36 h to obtain the TPS pellets.

5. Mixing PLA and PCL in the presence of a coupling agent (maleic anhydride) and a radical initiator (benzoyl peroxide).

6. Obtaining the pellets from the binary blend mixture [T2] through extrusion at a screw rate of 40 to 60 rpm with a temperature profile of 120-140/140-160/160-180/150-170° C.

7. Obtaining the flexible film through extrusion from the mixture of the TPS pellets and the binary blend [T3] at a screw rate of 40 to 60 rpm with a temperature profile of 110-130/125-145/155-175/135-155° C.

Likewise, the invention reveals the flexible sheets obtained through the procedure previously described comprising: native or hydrolyzed cassava starch treated with a plasticizer agent, polylactic acid, polycaprolactone, maleic anhydride, and benzoyl peroxide.

The following presents a series of examples that illustrate the best way to carry out the first object of the present invention.

MODE FOR THE INVENTION

Mode for Invention

Example 1

Elaboration of the Flexible Film from a Ternary Blend [T1] (TPS+PLA+PCL)

Preparation of Thermoplastic Starch

Native cassava starch presents an initial humidity of 10 to 13%. To start the extrusion, a conditioning process is carried out in the starch, which consists of adding glycerol and water. The water's function is to increase humidity to 18% to keep the mixture from drying and impeding the flow in the extruder barrel. Once mixed, it is left to rest for 1 h in an airtight container. Finally, thermoplasticization is carried out by using a single-screw extruder (Thermo Scientific, model Haake Polylab OS) provided with a barrel 19 mm in diameter, a screw with a compression ratio of 5:1 and an L/D ratio of 25. A rod die [T2] is used, coupling a 1-mm diameter nozzle at its opening. The screw rate is set to 55 rpm and the temperature profile: 103/106/113/99° C. for the three zones of the barrel and the die [T3], respectively. Upon extruding the mixture, a TPS rod [T4] is obtained, which is then pelletized and dried at 45° C. during 12 h. The final humidity of the pellets obtained must be less than 1% to perform the subsequent extrusion with the binary mixture.

Preparation of the Binary Blend [T5]

Initially, the PLA and PCL pellets are dried at 80° C. during 6 hours. The processing conditions used are: 70/30 ratio (PLA/PCL), addition of maleic anhydride and benzoyl peroxide (2 and 0.25% with respect to PLA/PCL weight, respectively), with a temperature profile of 130/150/175/165° C., screw rate of 30 rpm, screw with a compression ratio of 5:1 and L/D ratio of 25 employing a rod die [T6], coupling a 1-mm diameter nozzle at its opening. Once the rod [T7] is obtained, it is pelletized and vacuum packed.

Elaboration of the Flexible Film from the Ternary Blend [T8]

During the third extrusion, a mixture is carried out between the TPS and the binary mixture to obtain the flexible film. The processing conditions will be: screw with a compression ratio of 5:1 and L/D ratio of 25, blow die [T9] with a 70-μm opening, and a set of rollers to standardize the thickness of the flexible film.

Evaluation of Mechanical (Resistance to Tension, Elongation, and Young Modulus) and Thermal Properties of the Flexible Films The mechanical properties of the TPS+PLA+PCL films were determined according to the ASTM D882 standard. With the information on the equipment's load and displacement, maximum resistance (MPa), deformation (%) were obtained, along with Young modulus (MPa) for time intervals of 1, 8, 60, and 120 days to determine changes due to the aging of the flexible (TPS+PLA+PCL) films.

For thermal properties, samples were taken of the TPS+PLA+PCL films, TPS, PLA, and PCL of approximately 10 mg, previously conditioned at 50% relative humidity and temperature of 23° C., employing a calorimeter (TA Instruments model Q20). The sample was placed inside a sealed aluminum capsule and taken to the DSC thermal chamber. A first heating cycle is carried out from room temperature to 190° C. to erase the thermal history at a heating rate of 10° C./min, followed by an isotherm of 190° C. during 5 minutes. Thereafter, a cooling cycle is conducted from 190° C. to −80° C. at a cooling rate of 20° C./min and an isotherm of −80° C. during 5 minutes. Finally, a heating cycle is carried out from −80° C. to 200° C. to determine the vitreous transition temperature (Tg), the crystallization temperature, and the melting temperature (Tm) in the respective samples.

To evaluate the water vapor permeability, the gravimetric technique's desiccant method was selected according to ASTM-96 standard. Silica gel (0% RH) was added in a glass capsule, which was covered with the films and then this capsule was placed in a desiccator (50% RH) at a controlled temperature of 23° C. The cells were weighed on a RADWAG XA 110/X analytic scale. The weight of the capsules was recorded until obtaining a Time vs. Weight gained curve. Each test was run in triplicate. Thickness measurement was carried out in quintuplicate with a micrometer. To conduct the aging process, the material was stored in an environmental chamber for 1, 8, 60, and 120 days at 50% RH and 25° C.

The water vapor permeability (WVP) coefficient was calculated by using Equation 1.

$$WVP = \frac{(G/t)*L}{A*Pw*(RH1-RH2)} \quad \text{(equation 1)}$$

where WVP is the vapor permeability coefficient of (g/Pa*s m); G/t is the weight gain in the steady state [g/s]; L is the average film thickness [m]; A is the permeation area [$m^2$]; (RH1−RH2) is the difference of relative humidity, and Pw is the partial pressure of the water vapor at test temperature [Pa].

The results obtained for the flexible film obtained from native starch thermoplastic (SM 707-17)+PLA+PCL.

TABLE 1

| Mechanical properties (day 2) | |
|---|---|
| Property | Value |
| Resistance to tension (MPa) | 5.37 ± 0.52 |
| Deformation on the point of rupture (%) | 67.62 ± 19.91 |
| Elasticity modulus (MPa) | 136.92 ± 24.28 |

TABLE 2

Thermal properties

| Variety | Day | $Tm_{PCL}$ (°C.) | $\Delta Hm_{PCL}$ (J/g) | $Tc_{PLA}$ (°C.) | $\Delta Hc_{PLA}$ (J/g) | $Tm_{PLA}$ (°C.) | $\Delta Hm_{PLA}$ (J/g) | $Tm_{TPS}$ (°C.) | $\Delta Hm_{TPS}$ (J/g) |
|---|---|---|---|---|---|---|---|---|---|
| SM 707-17 | 2 | 56.13 | 3.11 | 103.81 | 3.73 | 150.31 | 6.28 | 180.50 | 96.74 |
| | 8 | 56.39 | 4.36 | 102.03 | 4.16 | 148.30 | 6.15 | 170.68 | 108.4 |
| | 60 | 57.54 | 5.32 | 94.93 | 3.62 | 138.59 | 4.74 | 169.47 | 133.30 |
| | 120 | 55.74 | 6.35 | 92.53 | 3.17 | 135.21 | 2.26 | 159.20 | 154.15 |

Tm: melting temperature
ΔHm: Enthalpy of fusion.
Tc: Temperature of crystallization.
ΔHc: Enthalpy of crystallization.

TABLE 3

Water vapor permeability

| DAY | SM 707-17 Native (g/Pa · s · m) |
|---|---|
| 1 | 8.26E-11 |
| 8 | 7.95E-11 |
| 60 | 7.12E-11 |
| 120 | 4.26E-11 |

Example 2

Study of Shelf Life of the 'Lady Finger' Banana Packed in Biodegradable Bags Composed of Starch, Polylactic Acid and Polycaprolactone We used thermoplastic starch (TPS), polylactic acid (PLA), and polycaprolactone (PCL) in proportions of 75:17.5:7.5 to obtain the bioplastic by using a simple extruder [Thermo Scientific, Haake Polylab OS, Germany]. Two films were implemented containing native (NBF) and hydrolyzed (HBF) TPS from cassava, from the SM 1495-5 variety.

Concentrations of oxygen ($O_2$), carbon dioxide ($CO_2$), and nitrogen ($N_2$) were established in three types of bags [FIG. 2a flexible native biodegradable film (NBF), FIG. 2b hydrolyzed biodegradable film (HBF), FIG. 2c polypropylene] during 10 days, bearing in mind environmental conditions of 23° C. and relative humidity (RH) between 50 and 70%. A portable gas analyzer was used [WITT, Oxybaby®]. Likewise, weight change was determined in the three packages between day 0 and 9 and the texture of the bananas was analyzed on day 10 by using a texture meter [Shimadzu model EZ-L].

FIG. 2 and Tables 4, 5, and 6 present the oxygen, carbon dioxide, and nitrogen concentration in the three types of packages containing 'lady finger' bananas during nine days.

On day 0, the biodegradable packages presented similar concentrations of the three types of gases with respect to the PF. However, on completion of the first day of having packed the fruit, a slight increase in oxygen concentration was noted in the HBF package, given that the thermoplastic starch comprising it corresponds to a hydrolyzed state. Possibly, its structure presents greater amorphous proportion, facilitating the transfer of this gas toward the interior of the package. Conte et al., 2011 mentioned that with greater gas barrier in the packages, reduced oxygen content is present and carbon dioxide content increases in the headspace. On day 1, the oxygen concentration in the HBF package was higher with relation to that presented by the PF (2.8 and 1.63%, respectively), where the water vapor probably coming from the fruit's transpiration accelerates the permeability of this gas in its amorphous structure [Dole et al., 2004]. This tendency is kept until day 3. On day 7, the NBF package showed increased gas concentration with respect to the other packages, with a value of 10.1%, which may be due to the thermoplastic starch present in the HBF package having a higher re-crystallization rate when having shorter starch chains with respect to those of the native state and, thereby, reducing oxygen permeability for entry into the package. This behavior remains until day 9. The PF presented oxygen stability oxygen from day 2 and maintained lower oxygen concentration with respect to the biodegradable films, given the lack of affinity with the water vapor from the banana. Almenar et al., 2008 mentioned that the ideal oxygen level to maintain adequate conditions in the packed product must be less than 6.9%, where the biodegradable films fulfilled this parameter until day 3.

TABLE 4

Oxygen concentration

| | Oxygen concentration (%)[1] | | | | | |
|---|---|---|---|---|---|---|
| | Day | | | | | |
| Package | 0 | 1 | 2 | 3 | 7 | 9 |
| NBF | 0.73 | 1.20 | 3.00 | 4.97 | 10.10 | 13.07 |
| HBF | 2.87 | 2.80 | 6.47 | 5.37 | 9.43 | 9.57 |
| PF | 3.37 | 1.63 | 4.03 | 2.33 | 4.77 | 4.77 |

[1]Mean.

While $CO_2$ increased in concentration in the three types of packages, being mainly a product of the banana respiration process, these values were higher in the biodegradable packaging (48.33 and 40.23%) with respect to the PF (25.57%), perhaps explaining greater permeability to $CO_2$ in the PF. From day 2, $CO_2$ reduction was noted in the three packages, which may be due to the water vapor generated in the transpiration of the banana, facilitating permeability of gasses through the film [Dole et al., 2004]. During follow up of the gas contents of the packages, the HBF retained the least amount of $CO_2$ with respect to the NBF package, given that it initially presented a structure with bigger amorphous proportions [MADR, 2011]; however, on day 9 gas concentrations were inverted in the two packages, with higher concentration in the HBF (16.13%) than in the NBF (10.03%) because of a possible greater rate of retrogression or reorganization of the starch chains. The study of shelf life was carried out until day 9, given that to prolong the shelf life of a fruit the $CO_2$ content must be above 15% [Almenar et al., 2008; Kim, Song and Yam, 1995; Rosenfeld, Mberg, Haffner and Sundell, 1999] and where the NBF package no longer fulfilled the previous reference.

TABLE 5

Carbon dioxide concentration

| Package | Carbon dioxide concentration (%) Day | | | | | |
|---|---|---|---|---|---|---|
| | 0 | 1 | 2 | 3 | 7 | 9 |
| NBF | 14.00 | 48.33 | 36.33 | 35.70 | 18.53 | 10.03 |
| HBF | 12.47 | 40.23 | 29.90 | 31.33 | 18.50 | 16.13 |
| PF | 12.33 | 25.57 | 17.47 | 20.20 | 13.90 | 13.40 |

[1]Mean.

TABLE 6

Nitrogen concentration

| Package | Nitrogen concentration (%) Day | | | | | |
|---|---|---|---|---|---|---|
| | 0 | 1 | 2 | 3 | 7 | 9 |
| NBF | 84.67 | 50.43 | 60.67 | 59.3 | 71.4 | 56.8 |
| HBF | 85.23 | 56.93 | 63.70 | 63.30 | 72.03 | 74.33 |
| PF | 84.27 | 72.8 | 78.13 | 77.53 | 81.33 | 81.63 |

[1]Mean.

On day 0, nitrogen concentration in the three types of packages was similar, with values between 84.27 and 85.23%. Upon completion of the first day of having packed the banana, a reduction of the content of this gas was noted, which was possibly due to $CO_2$ emission by the banana, which pushed nitrogen through the films and, thus, permitted its evacuation onto the environment. It is worth highlighting that the biodegradable films showed greater permeability to nitrogen with respect to PF. However, from day two, again the concentration of $N_2$ increased, probably due to a reduction of gas barrier of the respective films when exposed to water vapor from the transpiration and reduction of $CO_2$ emission by the banana. FIG. 1 shows an inversely proportional relation between the $N_2$ and $CO_2$ concentrations in the three types of packages.

Table 7 presents the percentage of the weight loss of the packages used in the study of the shelf life. Biodegradable packaging (NBF and HBF) presented greater weight loss (10.69 and 11.34%, respectively) with respect to PF (1.29%); given that in their composition they present components with greater polarity like thermoplastic starch, polylactic acid, and polycaprolactone, they permitted the liberation of water vapor from the transpiration of the banana. This did not occur in the PF package, where water vapor accumulation was present within the package to provide an adequate atmosphere for the proliferation of fungi. Almenar et al., 2008 and Conte et al., 2011 determined that packages composed of biodegradable materials like PLA have lower probabilities of generating an adequate atmosphere for the proliferation of coliform bacteria with respect to a package composed of a polyolefin (low-density polyethylene, LDPE), given that they present faster water vapor transmission (WVTR). Biodegradable packaging with an appropriate permeability coefficient can be advantageous in preventing contamination from microorganisms and insects without affecting the product's shelf life [Muratore et al., 2005].

TABLE 7

Weight loss of the packaged product

| Film | Triplicate | Weight of the packaged product (g) Day | | Weight loss (%) | Mean weight loss (%) |
|---|---|---|---|---|---|
| | | 0 | 9 | | |
| Hydrolyzed | H1 | 142.92 | 128.53 | 10.07 | 11.34 |
| | H2 | 160.28 | 142.61 | 11.02 | |
| | H3 | 154.63 | 134.65 | 12.92 | |
| Native | N1 | 154.21 | 136.93 | 11.21 | 10.69 |
| | N2 | 157.1 | 138.91 | 11.58 | |
| | N3 | 146.75 | 133.13 | 9.28 | |
| Synthetic | P1 | 146.62 | 144.86 | 1.20 | 1.29 |
| | P2 | 161.62 | 159.35 | 1.40 | |
| | P3 | 158.05 | 156.03 | 1.28 | |

Among the qualities for a product to remain fresh is that weight loss during its storage must be between 3 and 10% [Ben-Yehoshua, 1987]; however, Ohta, Shijna, and Sasaki, 2002 reported that if weight loss is above 5%, a reduction in the commercial value of the vegetable or fruit is generated; where bananas contained in the biodegradable packaging do not comply with any of the conditions.

As the shelf life process advanced for the bananas contained in the three types of packages, it was possible to note an aspect with higher degree of maturity in the biodegradable packaging; where upon observing the banana peel, it had yellow coloring with brown spots, while the banana contained in the PF packages had a greenish tone.

Upon ending the shelf life process, two tests were performed: one quantitative and another qualitative. The quantitative test consisted of evaluating the texture of the packed banana and it was compared to another sample maintained under the same conditions but without having been packed (pattern). Table 8 presents the maximum puncture force of the samples evaluated, establishing that the NBF package generated an optimum environment for the banana, given that it generated the greatest texture with a value of 7.09±1.17 N at a depth of 6.81±0.69 mm, which when compared to the pattern (6.42±2.46 N and 7.24±1.02 mm), presented greater consistency and the maturity rate was lower, given that this process starts with softening of the pulp from the peel toward its interior [Lwaterdo et al., 1999]. Harb and Streif, 2004, reported that upon presenting $CO_2$ concentrations above 12%, greater loss in fruit firmness is generated. On day 9, the NBF package presented lower $CO_2$ concentration with respect to the two other treatments and greater consistency in the banana.

TABLE 8

Maximum puncture force

| Film | Maximum force (N) | Displacement (mm) |
|---|---|---|
| Pattern | 6.42 ± 2.46 | 7.24 ± 1.02 |
| NBF | 7.09 ± 1.17 | 6.81 ± 0.69 |
| HBF | 5.22 ± 0.61 | 6.02 ± 0.22 |
| PF | 5.28 ± 0.74 | 6.40 ± 0.53 |

The qualitative test consisted of taking photographs of the peel and pulp of each of the treatments. Treatments NBF and HBF showed uniformity in the tonality of the intense yellow color, while the pattern maintained an intense yellow coloring, but with black spots. The banana contained in the PF package was pale yellow with a greater amount of black spots. Probably, the banana contained in the NBF package maintains the characteristic flavor of a fresh banana with greater content of sugars, given that Almenar et al., 2006 mentioned that with higher proportion of $CO_2$ within the packages, a negative contribution in the flavor of the packaged fruit is generated because the high levels of this gas are related to higher ethanol content.

According to the aforementioned, the advantage offered by biodegradable packages is to provide an environment to avoid possible microbial attacks through the evacuation of water vapor generated by the fruit.

The banana with optimal conditions after having been subjected to shelf life for nine days under conditions of 23° C. and relative humidity between 50 and 70%, corresponded to that packed with a native biodegradable film (NBF), which presented greater pulp texture and intense yellow coloring. Possibly, its flavor corresponded to that of a sample under adequate conditions.

Example 3

Obtaining Hydrolyzed Starch Enzymatically from Cassava Starch

Cassava starch with humidity between 8-10% was mixed with three parts distilled water and agitated at 200 rpm in a reactor until obtaining a suspension to which $CaCl_2$ 30% was added and pH was adjusted to 6. Thereafter, it was heated to 50° C., the α-amylase enzyme was added obtained from *Bacillus amyloliquefaciens* maintaining reaction conditions for at least 45 min and adjusting pH to 4 at a temperature of 40° C. Finally, it was refrigerated and washed with water and ethanol and dried at 45° C. for 24 h.

Although the present invention has been described with the preferred embodiments shown, it remains understood that the modifications and variations that conserve the spirit and reach of this invention are understood within the scope of the claims attached.

The invention claimed is:

1. A process for producing biodegradable flexible films, the process comprising the steps of:
    (a) milling and sieving cassava starch;
    (b) mixing the milled and sieved cassava starch of step (a) with glycerol to form a first mixture, and storing the first mixture for 12-36 hours at a temperature between 15 and 25° C.;
    (c) obtaining a thermoplastic starch rod from extrusion of the first mixture at a screw rate from 40 to 60 rpm;
    (d) drying the thermoplastic starch rod at a temperature between 40 and 50° C. for 12 to 36 hours;
    (e) mixing polylactic acid and polycaprolactone in the presence of maleic anhydride and benzoyl peroxide to form a second mixture;
    (f) obtaining pellets from extrusion of the second mixture at a screw rate from 40 to 60 rpm; and
    (g) obtaining a flexible film from extrusion of a mixture of the dried thermoplastic starch rod of step (d) and the pellets obtained from the second mixture at a screw rate from 40 to 60 rpm.

* * * * *